INVENTOR
W. C. SAND
BY SE Hollander
ATTORNEY

June 22, 1965 W. C. SAND 3,190,967

LINE CONCENTRATOR SYSTEM

Filed Dec. 31, 1962

7 Sheets-Sheet 3

June 22, 1965 W. C. SAND 3,190,967

LINE CONCENTRATOR SYSTEM

Filed Dec. 31, 1962 7 Sheets-Sheet 7

United States Patent Office 3,190,967
Patented June 22, 1965

3,190,967
LINE CONCENTRATOR SYSTEM
William C. Sand, Chatham, N.J., assignor to Bell Telephone Laboratories, Incorporated, New York, N.Y., a corporation of New York
Filed Dec. 31, 1962, Ser. No. 248,634
13 Claims. (Cl. 179—18)

This invention relates to telephone line concentrating systems and more particularly to concentrating systems of the passive scanning type which utilize a number of control conductors for transmitting information from the concentrator remote unit to the central office.

In general, remote line concentration is dedicated to a reduction in outside plant and copper costs by eliminating the usual electrical connection between each telephone substation and the central office. Instead, a relatively larger number of lines are terminating at a remote concentrator switching unit and extended as required over a relatively smaller number of trunks to a telephone central office.

In view of the severance of the usual direct connection between a substation line and the telephone central office, the conventional facilities for supervising line service conditions, such as the line relay at the central office, are no longer directly available to the remote substation line. Since the central office can no longer "see" the electrical condition of the line directly, various scanning arrangements have been devised to transmit information between the remote unit and the central office and vice versa. Two principal categories of scanning include "dynamic" scanning and "passive" scanning. The former refers to a synchronous arrangement in which counters at the remote unit and the central office are operated in unison. When a line exhibits a service request condition, both counters are arrested at a count indicative of the line requesting service. It is apparent that in dynamic scanning systems, a very substantial flow of signal information between the central office and the remote unit exists even though the concentrator is otherwise quiescent—with no converation taking place.

The passive scanning arrangement dictates the use of a number of coded number group or control conductors extending between the remote unit and the central office. Each line is identified upon a service request by energizing a particular combination of number group conductors which are detected at the central office to identify the service requesting line. This latter arrangement is advantageous since it does not require any continuously active elements during a quiescent period of concentrator operation. An advanced type of concentrator systems utilizing passive scanning is described in an application of C. E. Brooks and W. C. Sand, Serial No. 153,468, filed November 20, 1961.

In certain concentrator systems of the passive scanning type, information was transmitted on the control or number group conductors to identify a line requesting service, and thereafter a connection between the service requesting line and a selected idle trunk was effected by "marking" or applying a potential to the appropriate coded number group conductors and applying a marking potential to the selected idle speech trunk.

A gas tube which bridges the speech trunk and the control conductors fires and operates a relay to close crosspoints between the line and the trunk. Thereafter the gas tube is de-energized to decouple the speech trunk from the number group conductors. At this time the service requesting line has a metallic path over the operated crosspoints to the selected speech trunk and the central office. In essence, therefore, a "clean" metallic path free of bridging impedances is provided between the substation line and a corresponding line terminal at the office to which the line would have been connected if directly connected to the office—the ultimate goal of "universal" concentrator operation.

Although completely operative, satisfactory and useful, it must be recognized that the gas tube, although now de-energized, still provides a bridge between the signal or coded conductors and the speech trunk. Moreover, the particular gas tube which was energized was one of a number of gas tubes selected in consequence of the application of the marking potential to the number group conductors and to the speech trunk. In this respect the selection is, in effect, on a marginal basis whereby the voltage across the selected tube is higher than the firing potential of the tube and the voltage across nonselected tubes is presumably lower than the firing potential.

It is apparent that any marginal selection of this type is subject to difficulty whenever the appropriate margins are exceeded. As an example, if a connection is established to a called substation line in the manner described above and the gas tube coupling the speech trunk to the coded conductors has been de-energized, transient or spurious potentials on the speech trunk appear at the gas tube which bridges the speech trunk and the number group conductors. If the gas tube erroneously fires, potentials may be applied to the signal conductors to adversely effect other connections. In consequence, although the margins of operation may be carefully determined to insure satisfactory operation under all foreseeable circumstances thereby preventing unwanted connections and disconnections, a threat nevertheless remains in view of the bridging of the speech trunk to the coded conductors by the gas tubes.

In short, certain prior art arrangements which necessitated the application of marking potentials to the trunk conductors and the bridging of the number group conductors to the speech conductors, through the use of gas tubes or other breakdown devices present the possibility of operational irregularities in consequence of the application of other signaling or spurious potentials encountered on a speech trunk.

It is therefore an object of this invention to provide a telephone line concentrator system of the passive scanning type having a fully metallic path between the substation and the central office free of all bridging impedances.

Still another object of this invention is to provide a concentrator system of the passive scanning type wherein information is transmitted over the signal conductors in two directions.

Still another object of this invention is to provide a line concentrator system wherein information respecting a line identification is transmitted to the central office over a unique group of signal conductors and information respecting a selected trunk is conveyed from the central office to the remote switching unit over different ones of the same signal conductors.

A further object of this invention is to provide a line concentrator system of the passive scanning type in which no marking potentials are applied to the trunk conductors for the purpose of operating crosspoints at the remote switching unit.

These and other objects and features of the invention are achieved in one specific illustrative embodiment in which a line concentrator system includes a relatively larger number of substation lines connectable through a remote switching network to a relatively smaller number of concentrator speech trunks extending to the telephone central office. A plurality of signal conductors are also extended from the central office to the remote switching unit.

On a typical originating call, a line off-hook condition at the remote switching unit results in the application of a signal to a unique group of signal conductors indicative of the line identification. This identification is detected at the central office and the line terminal in the office unique to the calling subscriber's line is energized thereby simulating to the office an originating call from those line terminals—even though the substation itself is not connected to the terminals but instead terminated at the switching unit.

Conventional equipment in the office is utilized to extend a connection from an originating register or dial pulse register to the ("blank") line terminals in the office unique to the calling line. In the present arrangement the horizontal channel extending to these line terminals is also connected to a specific concentrator trunk extending to the remote switching unit. It now remains to operate the crosspoints in the remote switching unit for connecting the substation line to the selected trunk.

The line information is transmitted back to the remote switching unit after being detected in the central office and stored in individual line code relays over the same number group conductors which were utilized to transmit information from the remote switching unit to the central office in the first instance.

In lieu of applying marking potentials to the trunk as was the case in certain prior art devices, the present arrangement dictates the transference of the signal conductors from the previous function in transmitting line identification to the office to the further function of transmitting trunk identification from the office to the remote unit.

Thus, a particular signal conductor or signal conductors are operated on a biquinary basis to deliver information for registration at the remote unit indicative of the selected trunk identity. When this information is stored in the register, both the line and the trunk information are known and responsive equipment in the remote switching unit is utilized to operate the crosspoint between the selected trunk and the calling line as registered in the line code relays.

It is essential to observe that the line and the trunk information were both delivered from the central office to the remote unit over the signal conductors exclusively. Thus, the speech trunks themselves are not required for a marking operation thereby preventing erroneous marking when the speech trunks carry spurious or other potentials of the magnitude of the marking potentials.

To preserve clarity in the following description, only the equipment necessary for a full understanding of the present invention has been shown. Reference may be made to the above referred-to-application for detailed descriptions of suitable apparatus shown herein generally symbolically.

These and other objects and features of the invention may be more readily comprehended from an examination of the following description, appended claims and attached drawing in which:

FIGS. 1 and 2 indicate a specific illustrative embodiment of the invention in general outline format;

FIGS. 3–7 include the detailed circuitry shown in outline form in FIGS. 1 and 2; and FIG. 8 indicates the manner in which FIGS. 3–7 are to be disposed in order to disclose the invention.

*General description*

Referring now to FIGS. 1 and 2, an outline diagram of the over-all concentrator system is shown.

The major components include a switching network having a matrix of crosspoints for connecting the individual substation lines of which only line 10 is shown as illustrative of the ten trunks 0–9 of which only two (TRK0 and TRK9) are shown. Separate groups of relays 4T– and 5TKS– are included respectively in the trunk connect circuit and the trunk release circuit of FIG. 1.

The originating line coder of FIG. 1 is an arrangement for impressing distinctive signals on the number group conductors NG1–NG8 uniquely representative of a particular line. This arrangement is shown in detail in FIG. 6 and, moreover, in the application referred to above.

The line code relays 5LCR– are utilized in FIG. 1 as a register for storing information transmitted from the central office representative of a particular line number. Thus, as shown in FIG. 5 an individual line code relay 5LCR– is provided for each number group conductor. Since the trunk connect circuit includes an individual group of relays 4T– for each substation line terminated at the concentrator, individual access facilities for coupling the number group conductors to the desired group of relays 4T– must be provided. These are shown generally as contacts on relays 6CON– which govern access by the number group conductors to the trunk connect circuit.

The trunk hold and connector arrangement includes a plurality of relays 6TH– and 6CON– both of which are individual to the substation lines. The contacts on the latter relays 6CON– are those in series with the trunk connect circuit relays 4T–, as explained above, and therefore determine the particular group of trunk relays involved in a call.

The transfer relays 6TR2 and 6TR1 shown in FIG. 2 perform the essential function of sequencing the information transmitted over the number group conductors in a manner which permits the delivery of line information to the line code relays 5LCR– and thereafter permits delivery of the trunk information to the relay 4T–. In addition, these relays govern the transmission of information from the originating line coder 20 to the central office.

Thus, when relays 6TR1 and 6TR2 are released, the normal contacts of relay 6TR1 permit transfer of information from the originating line coder 20 of FIG. 1 over the number group conductors NG1–NG8 to the originating line detector 21 in the applique circuit of FIG. 2. Moreover, when relay 6TR1 is operated and relay 6TR2 is released, the operated contacts of relay 6TR1 in conjunction with the normal contacts of relay 6TR2 provide access from the number group conductors to the line code relays 5LCR– to transmit line information from the central office to the remote unit. When relays 6TR1 and 6TR2 are both operated, a path is extended over the operated contacts of relays 6TR1 and 6TR2 and the appropriate contacts of relays 6CON– to a particular group of trunk relays 4T– unique to a given line. This latter path is utilized as hereinafter explained in detail for the transmission of trunk information.

The detector circuitry shown generally in the applique includes a translating relay 7TRSL– which is individually responsive to the number group conductors NG1–NG8.

The particular translating relays operate are indicative of the calling line identification. The marking circuitry shown symbolically including manual switches 21–24 are utilized to apply marking potentials to the number group conductors indicative in one instance of the line identification and in a succeeding instance of the trunk identification. Appropriate apparatus for applying the marking potentials is shown in detail in the above-referred-to application.

It will be noted that the marking circuitry does not include any facilities for applying marking potentials to the speech trunk conductors and that, instead, it is apparent from the block diagram outline that a metallic path, completely free of all bridging impedances, is established between the remote switching unit and the conventional line link frame in the central office once the trunk hold relay 6TH– and appropriate relay 4T– are operated. This path will be traced in the following description of operation.

*General description of originating call*

It will be assumed for purposes of illustration that a calling party at substation 10 is initiating an originating call to a called party in a distant office. When the substation 10 goes off hook, a path is available to operate the line relay unique to the calling substation line. Only one relay 3L10 is shown, as illustrative. The operation of the line relay 3L10 over the contacts of relay 6TH10 results in the energization of the originating line coder 20 of FIG. 1 to apply a distinctive group of signals to the number group conductors NG1–NG8 indicative of the identification of line 10. For illustrative purposes, it may be assumed that conductors NG1, NG6 and NG7 are energized. Detecting equipment in the central office shown in detail in the above-referred-to application and number group conductor. Thus, three relays 7TRSL1, also in FIG. 7 include relay facilities unique to each 7TRSL6 and 7TRSL7 (only 7TRSL1 being shown) are operated to indicate to the central office the particular line requesting service.

The contacts of the relays 7THSL– are arranged to provide a translation from the subscriber's number group code or "concentrator" number, to the subscriber's line number in the central office. Thus, as shown symbolically in FIG. 2, the contacts are arranged to energize a particular line relay 7L10 in the No. 5 crossbar central office unique to the subscriber's line.

The No. 5 crossbar office in accordance with conventional procedure interprets the operation of the line relay as a calling signal in the same manner that a direct-connected line signal would be interpreted. Thus, the office is "unaware" of the fact that a concentrated line is involved thereby indicating the universality of the concentrator.

The common equipment in the No. 5 crossbar office responds to the service request in a routine manner and prepares to connect an originating (dial pulse) register to the line termination T, R and S in the central office line link frame unique to the calling subscriber's line. It will be observed that the substation loop itself is not terminated at this location in the central office but instead is terminated at the remote concentrator switching unit.

When the central office extends a connection between the originating register and the vertical path T, R and S representing the calling subscriber's line in the central offce, the marker in accordance with conventional procedure automatically selects a particular horizontal channel extending to the desired vertical (at which the line would have been terminated if directly connected to the office). This procedure is described in detail in a patent of A. J. Busch of February 19, 1952, No. 2,585,904.

As shown in FIG. 2, the horizontal channels on the line link frame are extended over trunks TRK0–TRK9 into the field. Consequently, when a particular horizontal channel is selected, the trunk unique to that channel is the selected trunk. Appropriate responsive apparatus in the applique circuit, shown in detail in FIG. 7 and the above-referred-to application, is effective upon selection of the horizontal and vertical channels at the line link frame n the central office to apply marking potentials to the number group conductors sequentially, to energize a particular crosspoint at the remote unit for coupling substation 10 to the selected line. If trunk 0, for example, is the selected trunk, crosspoints 4T0,4(10) between substation 10 and trunk 0 will be operated to extend a metallic path free of all bridging impedances from substation 10 to the central office.

In practice, this takes place by the application of marking potential to the number group conductors by the marking circuit indicative of the line identification. Thus, as shown symbolically, manual switches 22–24 will be operated to apply marking potentials to number group conductors NG1, NG6 and NG7 which in turn operate the line code relays 5LCR1, 5LCR6, 5LCR7 of which only 5LCR1 is shown in FIG. 1 to store the calling line identification. It will be noted that prior to the operation of the line code relays, relay 6TR1 was operated to divorce the number group coder from the number group conductors and to extend a path to the line code relays 5LCR–.

Having stored the line identification in the remote switching unit, the central office now prepares to deliver the trunk information over the same number group conductors but utilizing a different code as explained herein in detail. Thus, if trunk 0 is a selected trunk, switch 24 in the marking circuit is operated after the operation of relay 6TR2 to extend a path to the trunk connector circuit to operate the particular trunk relay 4T0,5(10) in the group of trunk relays unique to the subscriber line. The particular group of trunk relays is determined by the operation of relay 6CON– (in this example, 6CON10, not shown) which is unique to the substation line 10 and which in turn is operated in consequence of the storage in the line code relays 5LCR1, 5LCR6 and 5LCR7 of the line information as explained in detail herein.

Operation of relays 4TO(10) and 6TH10 thereafter completes a metallic path from the calling substation to the line link frame over trunk TRK0. From the line link frame, a further path extends to the originating register (not shown) in accordance with routine practice. At this time the subscriber may dial the called number and subsequent operations are performed conventionally to connect the calling line to the called line through the No. 5 crossbar office as explained in detail in the above-referred-to patent to A. J. Busch.

*General description of disconnect operation*

When the conversation has been completed and the subscriber at substation 10 returns his receiver to the switchhook contacts, conventional supervisory equipment in the trunk circuit at the central office detects the decrease in direct current and initiates the usual disconnect operation in the No. 5 crossbar office. In accordance with conventional practice, the ground connection is removed from the sleeve conductor and the line appearance unique to substation 10 in the office. This procedure results in the transmission of a signal to the concentrator control circuit identifying the trunk requiring disconnection. A positive potential is applied to conductor NG8 to operate transfer relay 6TR1. Upon the operation of the latter relay 6TR1, a path is available for the concentrator control circuitry in the applique circuit at the central office to apply a positive potential to selected number group conductors NG6, NG7 and NG8 to operate relays 5LCR6–5LCR8. This results in the operation of transfer relay 6TR2. A path is then closed for the concentrator control to operate a particular trunk disconnect relay 5TKS– in the trunk disconnect circuit at the remote unit. Assuming that trunk TRK0 is the selected trunk requiring disconnection, a negative potential is applied to number group conductor NG1 to operate relay 5TKS0. Operation of relay 5TKS0 results in the release of relays 4T0 and 6TH1 in view of the opening of the contacts of relay 5TKS0 in series with the holding path for those relays as explained in detail herein. Subsequently, the control circuit is returned to normal by removing the positive potentials at number group conductors NG6, NG7 and NG8.

*Description of major components*

Referring now to the remote circuitry of the concentrator illustrated in FIGS. 3–6, it is seen that the remote concentrator includes a group of connect relays, one relay unique to each substation line. These relays include 55 connect relays of which only two, 6CON1 and 6CON55, are shown. The function of the connect relays is to provide a unique path between the number group conductors NG1–NG8 and a group of trunk relays (4T0,5–4T4,9) individual to each subscriber's line. By operating a particular connect relay, for example relay 6CON1, and delivering information over the number group conductors indicative of a particular trunk relay to be operated, only that trunk relay associated with substation 1 will receive the information over the operated contacts of connect relay 6CON1.

The crosspoint network between the lines and trunks to the central office includes the contacts of trunk relays 4T0,5–4T4,9 unique to each substation line. By operating a particular trunk relay, for example relay 4T0,5, unique to line 55, a metallic path is extended from substation 55 to trunk TRK0 which in turn extends to the central office.

A group of line code relays 5LCR1–5LCR8 unique to the number group conductors NG1–NG8 is utilized for storing information indicative of a particular line identification or a particular control function to be performed. Thus, the application of potentials to particular number group conductors, for example conductors NG1–NG3, at the central office may be utilized to operate line code relays 5LCR1–5LCR3, respectively, at the remote unit.

Since the number group conductors NG1–NG8 must in the present arrangement transmit trunk identification information as well as line identification information, transfer switching facilities are required to isolate the two groups of information and direct the line information only to the line code relays and the trunk information to the trunk relays 4T0–4T4 or the trunk release or disconnect relays 5TKS0–5TKS9 as required. This transfer function is performed by relays 6TR1 and 6TR2 which in turn are operated by particular code potentials applied to the number group conductors.

As indicated in FIG. 5, a group of trunk disconnect relays 5TKS0–5TKS9 uniquely corresponding to trunks TRK0–TRK9 are utilized in marking a particular trunk for disconnection at the remote unit. The manner in which trunk information is divided between the trunk relays 4T0,5–4T4,9 and the trunk release or disconnect relays 5TKS0-5TKS9 relates to the polarity of potentials applied to the number group conductors as explained further herein.

In the following description it will be observed that the number group conductors NG1–NG8 have a dual coding significance which is related to the sequential nature of information transmitted in which the number group conductors are utilized initially to transmit line identification and subsequently to transmit trunk identification. Thus, number group conductors NG1–NG8 are connected to the substations 1–55 in a manner which provides for a three-out-of-eight coding identification. As shown in FIG. 6, substation 1 is uniquely identified by the application of pulses to the three number group conductors NG1–NG3.

While the coding of the line conductors is on a three-out-of-eight basis, the trunks are coded on a biquinary basis utilizing only the first six number group conductors NG1–NG6. In this respect, if the trunk number to be transmitted is zero to four, number group conductors NG1–NG5 alone are energized. If the trunk identity is in the range from five to nine, the number group conductors to be energized would again be a single conductor in the group NG1–NG5 and, in addition, the "high-five" conductor NG6. This arrangement may be seen fully from the following Table I:

| Trunk: | Number group identity |
|---|---|
| TRK0 | NG1 |
| TRK1 | NG2 |
| TRK2 | NG3 |
| TRK3 | NG4 |
| TRK4 | NG5 |
| TRK5 | NG1, NG6 |
| TRK6 | NG2, NG6 |
| TRK7 | NG3, NG6 |
| TRK8 | NG4, NG6 |
| TRK9 | NG5, NG6 |

The line or sensory relays 3L1–3L55 shown in FIG. 2 are unique to the respective substation lines and perform the usual supervisory function in responding to line off-hook conditions. The corresponding cutoff or transfer function for disconnecting the line from the number group conductors and connecting the line instead to the crosspoint network is performed by the contacts of relays 6TH1–6TH55 which relays correspond individually to substation lines 1–55

Relay 7TFR is a transfer relay adapted to isolate the detector from the marking circuit and is operated whenever a marking function occurs as shown symbolically by switch 78 and described in detail in the above-referred-to application.

It will be noted that the marking circuitry includes $V_{PH}$ and $V_{NH}$ which are higher than $V_P$ and $V_N$, respectively, to permit operation of the Zener diodes 50 and 64 at the higher levels but not at the lower.

*Detailed description of operation—Establishing a connection*

Figure 1:
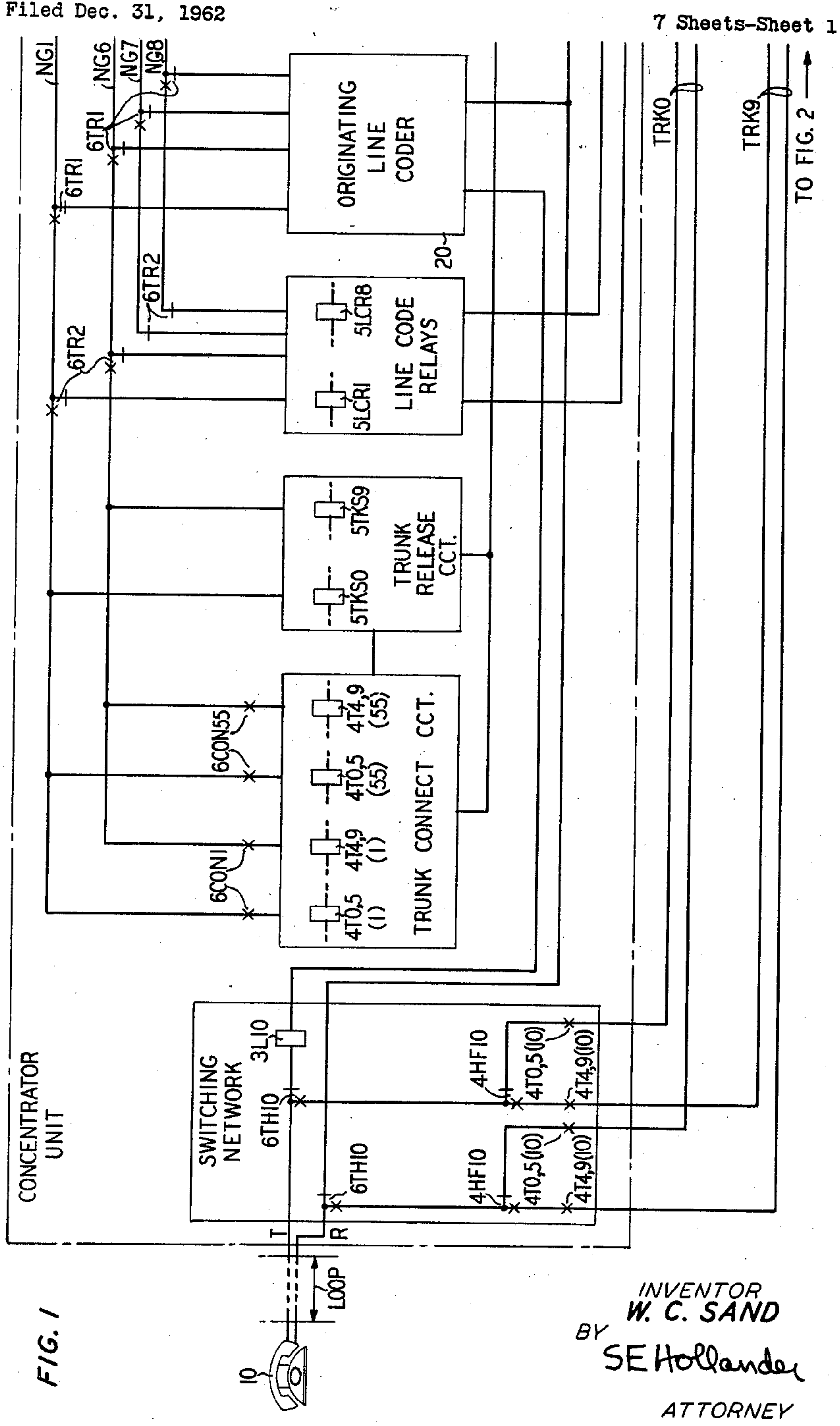
Figure 2:
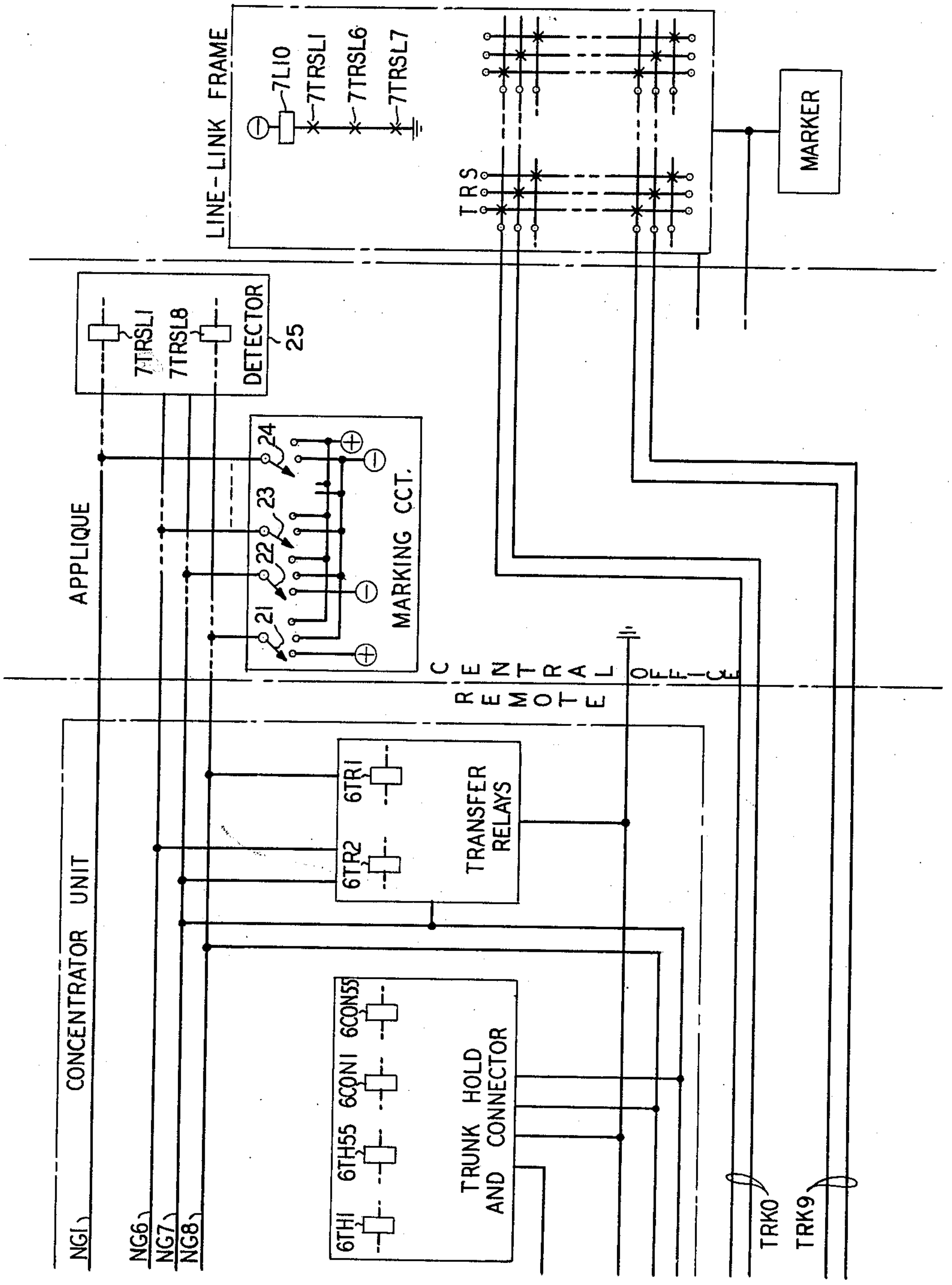
Figure 8:
Figure 3:
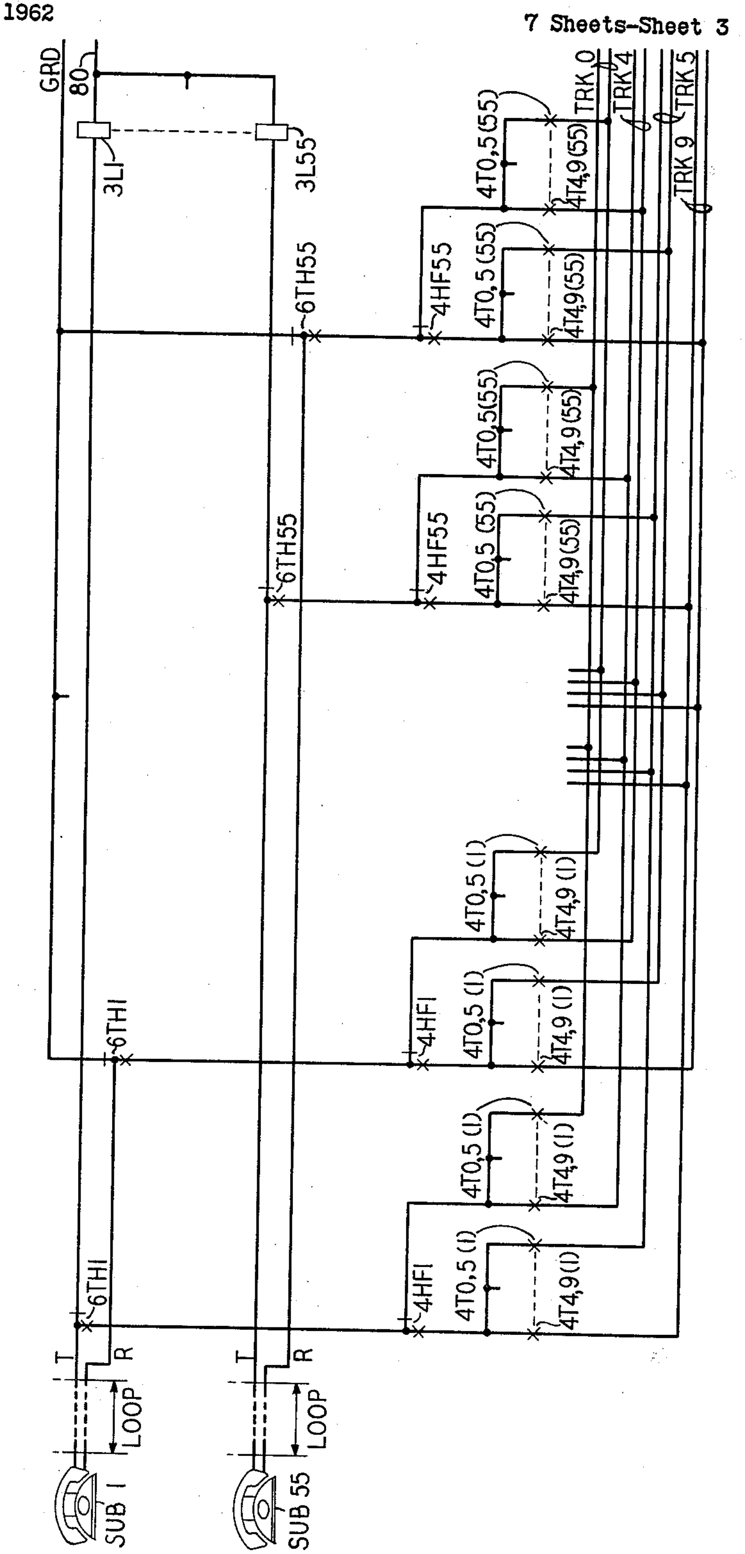
Figure 4:
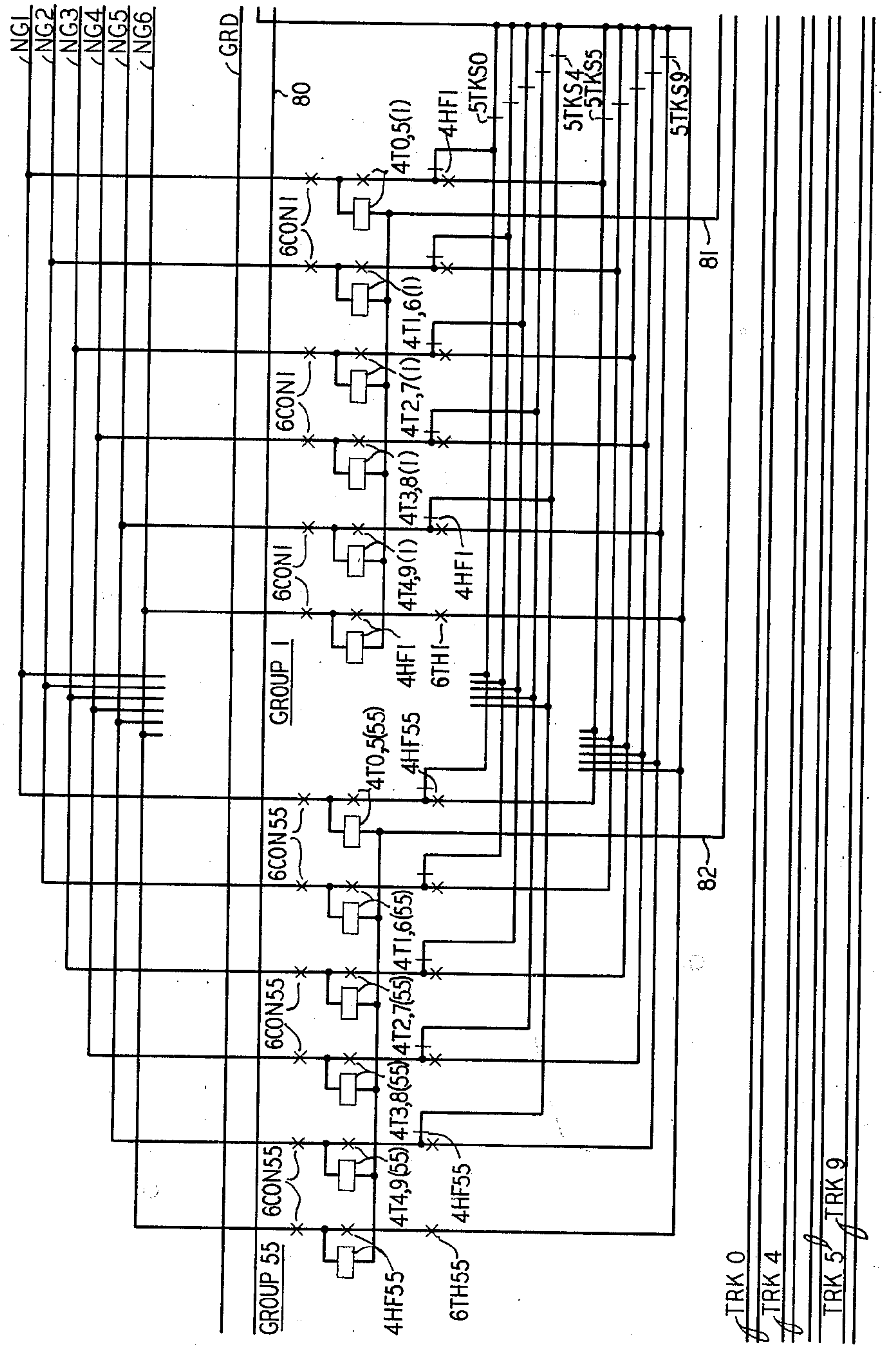
Figure 5:
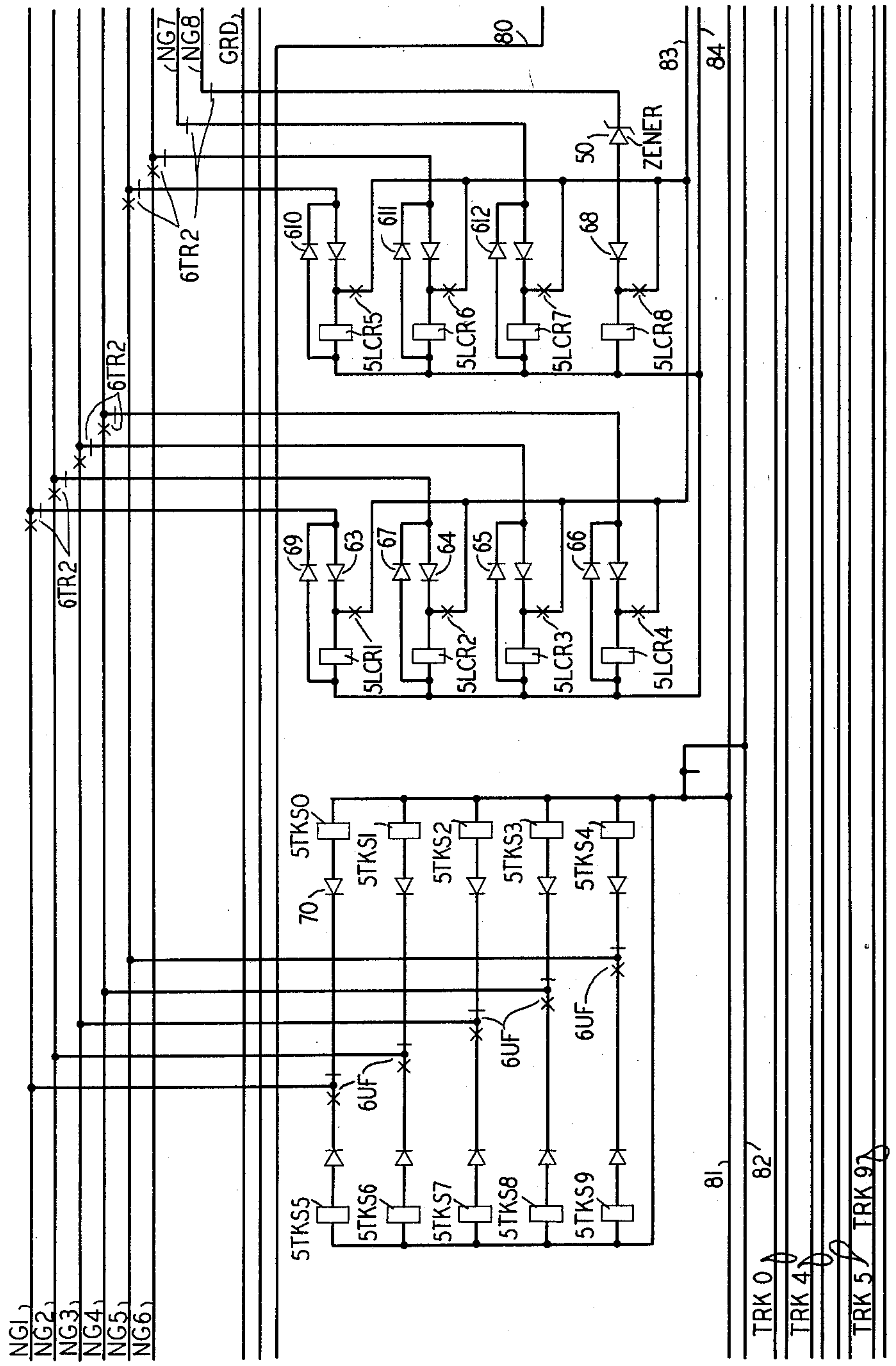
Figure 6:
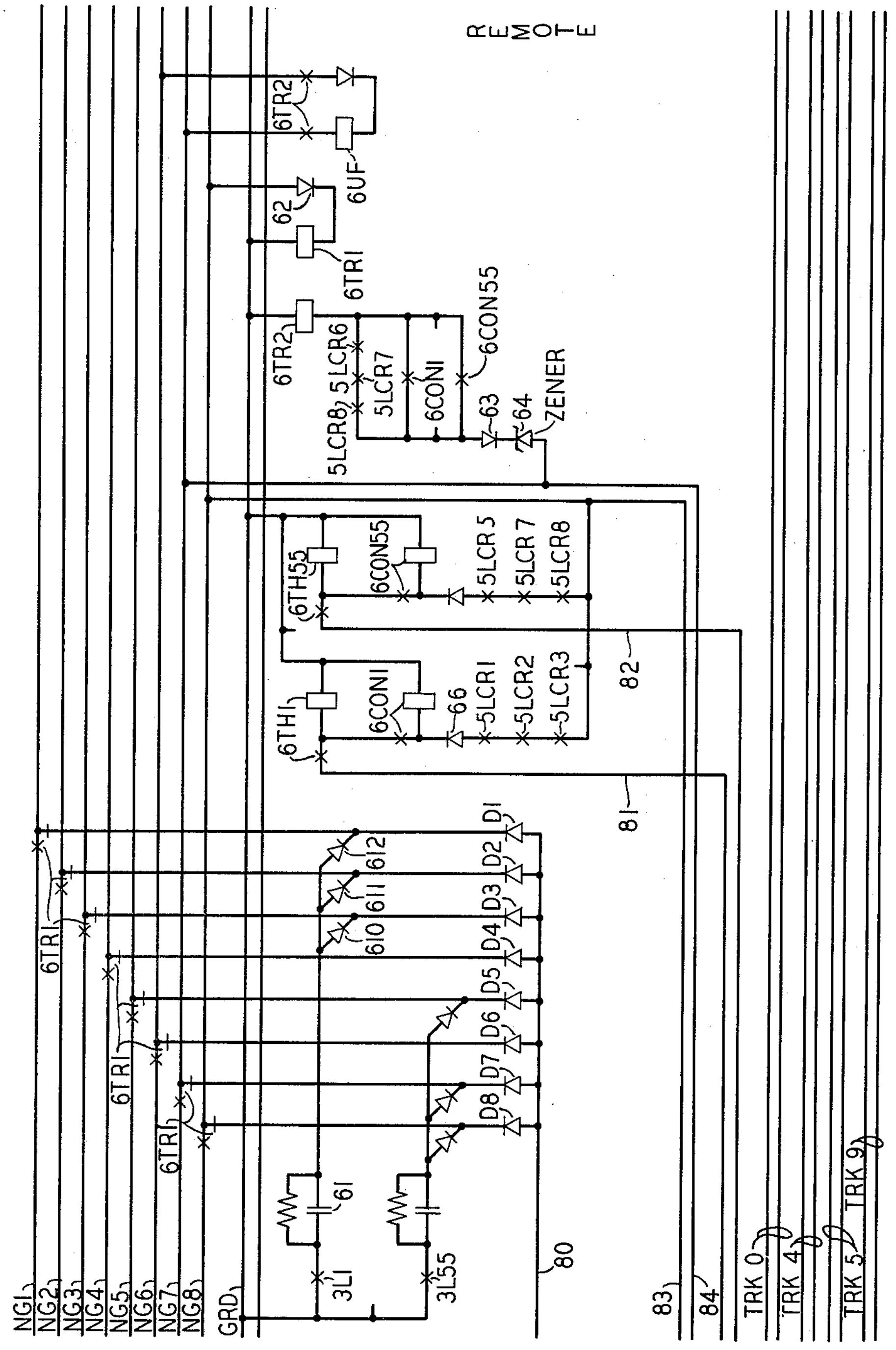

It will be assumed for purposes of illustration that substation 1 is initiating a service request call. When substation 1 goes off hook, a circuit may be traced from ground at the central office over conductor GRD, contacts of relay 6TH1, ring conductor of the loop, substation 1, tip conductor of the loop, contacts of relay 6TH1, winding of relay 3L1, diodes D1–D8 in parallel, contacts of relay 6TR1, number group conductors NG1–NG8 in parallel to negative battery at the central office. Relay 3L1 operates over this path and the contacts of relay 3L1 in FIG. 6 apply a pulse to capacitor 61 which is transmitted over diodes 610, 611 and 612 in parallel, contacts of relay 6TR1, number group conductors NG1–NG3 in parallel to detector relays 7TRSL1–7TRSL3 unique to number group conductors NG1–NG3 in the central office. The contacts of relays 7TRSL1–7TRSL3 perform a translating function to operate a particular line relay 7L1 unique to the subscriber's line. This relay is the conventional relay in the No. 5 crossbar central office and initiates operation of the conventional equipment in the office to establish a dial tone or originating register connection to the line appearance unique to the calling substation in the central office.

As a part of the conventional switching functions, the select magnet 7SEL0 which indicates the horizontal channel used in the connection is operated by the marker as shown symbolically by the operation of switch 77 and in parallel therewith a relay 7MK unique to the corresponding concentrator trunk TRK0 is operated as explained in detail in the above-referred-to application.

Figure 7:
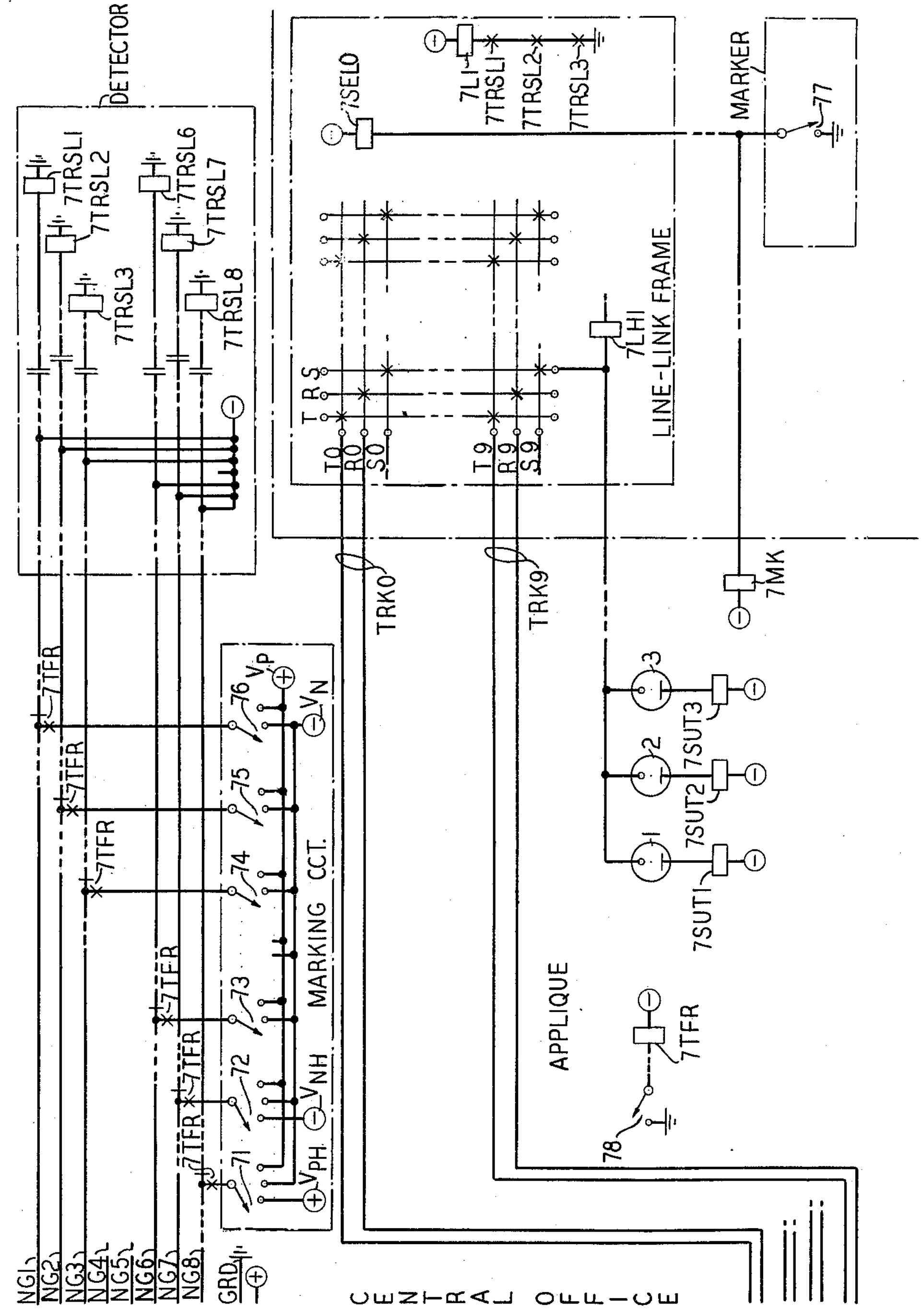

When the line hold magnet 7LH1 unique to the subscriber's line appearance in the central office is conventionally operated, a further translation is made in the central office to regenerate the concentrator code number unique to the subscriber, also as explained in detail in the above-referred-to application. This operation is shown in simplified format over gas tubes 1, 2 and 3 to operate relays 7SUT1, 7SUT2 and 7SUT3 of FIG. 7 unique to signal conductors NG1–NG3, respectively. In response to this latter translation, a positive potential $V_P$ is applied to number group conductor NG8 (after relay 7TFR is released) as shown symbolically by closing switch 71 to source $V_P$ to operate relay 6TR1 over diode 62.

Operation of transfer relay 6TR1 transfers the number group conductors from the originating call signaling circuit to permit transmission of line information from the central office to the remote unit. Moreover, any other concurrent originating service requests are blocked from entry into the control unit at the central office.

At this time positive potential is applied to the number group conductors associated with the calling substation's concentrator code number. Since it has been assumed that substation 1 has a concentrator code number including number group conductors NG1–NG3, a positive potential $V_P$ is applied to those three conductors over switches 74–76 and a negative potential $V_N$ to the remaining number group conductors over the remaining switches except switch 71 which is connected to $V_P$. A path may now be traced for the operation of line code relay 5CLR1 from positive battery at the central office, switch 76, contacts of relay 7TFR, number group conductor NG1, contacts of relay 6TR1, contacts of relay 6TR2, diode 63, winding of relay 5LCR1 and back over diodes 66 and 610–612, number group conductors NG4–NG7 in parallel to negative battery at the central office. Relays 5LCR2 and 5LCR3 are operated over similar paths to complete storage of the line information in the remote unit. Subsequently, switches 74–76 are restored to negative battery and relays 5LCR1–5LCR3 remain operated over their own contacts between leads NG7 and NG8.

Relay 6CON1 is operated over a path from positive battery $V_P$ at the central office, switch 71, number group conductor NG8, contacts of relays 5LCR3, 5LCR2, 5LCR1, diode 66, winding of relay 6CON1 to ground at the central office. When relay 6CON1 operates, relay 6TH1 operates over the contacts of relay 6CON1 in an obvious path.

At this time leads NG1–NG5 have all potential removed therefrom at switches 74–76, etc., and number group conductor NG7 has a high negative potential applied thereto by moving switch 72 to the negative source $V_{NH}$ to operate relay 6TR2 over a path from ground at the central office, winding of relay 6TR2, contacts of relay 6CON1, diode 63, diode 64, number group conductor NG7 and contacts of relay 7TFR to negative battery $V_{NH}$ at the central office.

Operation of relay 6TR2 transfers the number group control conductors over the operated contacts of relay 6CON1 (unique to substation 1) to relays 4T0,5–4T4,9 and 4HF1.

The remote equipment is now prepared to accept transmission of information representing the selected trunk. Since it is assumed that trunk TRK0 is the selected trunk, a positive potential will be applied to number group lead NG1 (see Table I) and may be traced over a path from source $V_P$ including the contacts of relays 7TFR, 6TR1, 6TR2, 6CON1, winding of relay 4T0,5(1), contacts of relay 6TH1, winding of relay 6TH1 to ground at the central office. Relay 4T0,5(1) is operated over this path and results in the connection of substation 1 to trunk TRK0 over a path including the ring conductor of substation 1, contacts of relays 6TH1, 4HF1, 4T0.5 to the ring conductor of trunk TRK0. A similar path may be traced for the tip conductor of the trunk and the tip conductor of the substation loop. A speech path now exists from substation 1 over trunk TRK0 to the central office and the originating register (not shown) which is connected to the line appearance of substation 1 thereat. The subscriber may now proceed to dial the digits of the called directory number into the originating register at the central office and a connection will be extended in the conventional manner through the telephone office to the called directory number. At this time all of the switches 71–76, etc., are restored to negative battery to permit the common equipment in the remote unit to be released for serving other calls. If the selected trunk was in the group TRK5–TRK9 (the "high-five" group), relay 4HF– would have been operated in addition to the trunk relay by the application of a positive potential to conductor NG6 as indicated in Table I.

*Detailed description of disconnect operation*

It will now be assumed that the conversation has been completed and that the subscriber at substation 1 returns the receiver to the switchhook contacts. Conventional supervisory equipment connected to the line circuit in the No. 5 crossbar office senses the decrease in current over the loop and concentrator trunk TRK0 and initiates the conventional disconnect procedure in the No. 5 crossbar office. This includes the removal of the usual ground connection from the sleeve conductor of the line appearance unique to substation 1 in the office. This procedure results in the transmission of a signal to the concentrator control circuit indicative of the trunk requiring disconnection as explained in detail in the above-referred-to application.

Thereafter, the concentrator control circuitry applies a positive potential from source $V_P$ to number group conductors NG6 and NG7 and a potential of $V_{PH}$ over switches 71–73. A negative potential is applied to conductors NG1–NG5 over switches 74–76, etc. Relay 6TR1 is operated over a path including number group lead NG8, diode 62, and the winding of relay 6TR1. In this instance the higher of the two positive voltage sources is applied to conductor NG8 and, in consequence, a path is available over conductor NG8 and the contacts of relays 6TR1 and 6TR2, Zener diode 50, diode 68, winding of relay 5LCR8, diodes 65–69, etc., in parallel to number group conductors NG1–NG5 in parallel and negative battery at the central office. Similar paths may be traced for the operation of line code relays 5LCR6 and 5LCR7 as a result of the positive potentials $V_P$ applied to number group conductors NG6 and NG7.

At this time leads NG1–NG6 are all open-circuited at switches 73–76.

Thereafter, a high negative potential from source $V_{NH}$ is applied to conductor NG7 by switch 72 to operate relay 6TR2 over a path including ground at the central office, conductor GRD, winding of relay 6TR2, contacts of relay 6CON1, diodes 63, 64 to number group conductor NG7. With the operation of relay 6TR2, a path is available for the operation of a particular trunk disconnect relay 5TKS– unique to the trunk requiring disconnection. Since it has been assumed that trunk TRK0 is the trunk to be disconnected, a negative potential $V_N$ applied to number group conductor NG1 operates relay 5TKS0 over a path including negative battery at the central office, switch 71, conductor NG1, contacts of relays 6TR1, 6TR2, 6UF, diode 70, winding of relay 5TKS0, contacts of relay 6TH1, winding of relay 6TH1 to ground at the central office. This path provides current flow through the winding of relay 5TKS0 unique to trunk TRK0 and the operation of relay 5TKS0 results in the release of relays 4T0,5(1) and 6TH1 in view of the opening of the normally closed contacts of relay 5TKS0 in series with the holding path for those relays. Thereafter, the control circuit is restored to normal by restoring all number group conductors to a negative potential. If the trunk to be disconnected were in the group TRK5–TRK9, relay 6UF would have been operated during the disconnect operation by applying a positive potential over switch 73 to conductor NG6 and a negative potential to lead NG7. Under these conditions a path is prepared to operate relays 5TKS5–5TKS9 unique to trunks TRK5–TRK9.

Although the illustrative embodiment refers to a centralized line concentrator, it will be understood by those skilled in the art that the invention is also applicable to a "distributed" line concentrator of the type described in the above-referred-to application.

Moreover, it is to be understood that the above-described arrangements are illustrative of the application of the principles of the invention. Numerous other arrangements may be devised by those skilled in the art without departing from the spirit and scope of the invention.

What is claimed is:

1. A telephone line concentrator system including a plurality of remote substation lines, a telephone central office, a plurality of speech trunks extending from said office, a plurality of control conductors extending from said office, remote switching means for connecting said lines to said trunks under control of said office, means individual to said substations and coupled to said control conductors in accordance with a code representative of the line identification, and means at said central office for controlling said remote switching means to connect a particular one of said lines to a selected idle speech trunk including means for energizing a group of said control conductors uniquely representative of said particular line and for thereafter energizing a group of said control conductors uniquely representative of said selected trunk.

2. A remote telephone line concentrator system including a plurality of remote substations, a telephone central office, a plurality of speech trunks extending from said office, a plurality of control conductors extending from said office, remote switching means for connecting said lines to said trunks under control of said office, means individual to said lines and connected to a unique group of said control conductors in accordance with a code representative of the line identification, speech trunk register means at said remote switching means, line identification register means at said remote switching means, and means at said central office for sequentially connecting said control conductors to said line identification register means and to said speech trunk register means.

3. A telephone line concentrator system including a plurality of remote substation lines, a telephone central office, a plurality of speech trunks extending from said office, a plurality of control conductors extending from said office, remote switching means for connecting said lines to said trunks under control of said office, means at said remote switching means individual to said lines and coupled to a unique group of said control conductors in accordance with a code representative of the line identification, means at said remote switching means responsive to an originating call at one of said lines for delivering a signal over said group of control conductors unique to said one line to said central office, and control means at said central office responsive to the reception of said signals for energizing said remote switching means to connect said one line to a selected idle trunk, said control means including means for initially applying signals to said control conductors uniquely representative of said one line and for subsequently applying signals to said control conductors uniquely representative of said selected idle trunk.

4. A telephone line concentrator switching system including a plurality of remote substation lines, a telephone central office, a plurality of speech trunks extending from said office, a plurality of control conductors extending from said office, remote switching means for connecting said lines to said trunks under control of said office, means individual to said lines and connected to said control conductors in accordance with a code representative of the line identity, first and second transfer means at said remote switching means, and control means at said central office for actuating said remote switching means to connect a particular line to a selected idle trunk including means for initially energizing said first transfer means to transmit information from said office over said control conductors representative of said particular line identity to said remote switching means, and for subsequently energizing said second transfer means to deliver signals over said control conductors to said remote switching means representative of the identification of said selected idle trunk.

5. A telephone line concentrator system including a telephone central office, a plurality of remote lines, a smaller plurality of trunks extending from said office, a plurality of control conductors extending from said office, means individual to said lines and coupled to unique groups of said control conductors in accordance with a code, remote switching means for connecting said lines to said trunks under control of said office, means at said remote switching means responsive to a calling indication at one of said lines for transmitting signals to said central office over said control conductors, line registration means in said remote switching means individually representative of said lines, trunk registration means in said remote switching means individually representative of said trunks, crosspoint means in said remote switching means for coupling said lines to said trunks, and means in said central office responsive to the reception of said calling indication signals over said control conductors for initially energizing said line registration means uniquely representative of said calling line, for subsequently energizing said trunk registration means in said remote switching means to store the identity of a selected idle trunk, and for thereafter energizing said crosspoint means to couple said particular calling line to said selected trunk.

6. A telephone line concentrator system including a plurality of remote substation lines, a telephone central office, a lesser plurality of speech trunks extending from said office, a plurality of control conductors extending from said office, remote switching means for connecting said lines to said trunks under control of said office, means individual to said lines and connected to said control conductors in accordance with a code representative of the line identification, and means in said central office responsive to a hang-up indication at one of said lines for disestablishing a connection between said one line and a particular trunk including means for transmitting information to said remote switching means over said control conductors uniquely representative of a particular trunk to be disconnected.

7. A telephone line concentrator system including a telephone central office, a plurality of remote substation lines, a smaller plurality of trunks extending from said office, a plurality of signal conductors extending from said office, remote switching means for connecting said lines to said trunks in response to information transmitted from said office over said signal conductors, means at said remote switching unit responsive to a signal condition on one of said lines for energizing selected ones of said signal conductors in accordance with a code to transmit the identification of said line to said central office, means in said office responsive to the reception of said line identification for transferring said line identification back to said remote unit including means for energizing said selected signal conductors representative of said line identification, and additional means in said office for transmitting the trunk identification of a selected idle trunk to said remote unit including means for energizing said signal conductors in accordance with a code representative of said trunk identification.

8. A telephone line concentrator system including a telephone central office, a plurality of remote substation lines, a plurality of trunks extending from said office, a plurality of number group conductors extending from said office, remote switching means for connecting said lines to said trunks in response to signals transmitted from said office over said number group conductors, coder means in said remote switching means responsive to a signal condition on one of said lines for applying signals to selected number group conductors in accordance with a code uniquely indicative of the identification of said line, and means at said central office responsive to said signals for energizing selected ones of said number group conductors to disconnect said coder means from said number group conductors.

9. A telephone line concentrator system in accordance with claim 8 wherein said means for energizing said selected conductors to disconnect said coder means from said number group conductors includes first relay transfer means at said remote switching means connected to said selected number group conductors.

10. A telephone line concentrator system in accordance with claim 9 including in addition means at said central office effective after the operation of said first relay transfer means for thereafter applying signals to said number group conductors in accordance with a code uniquely representative of the identification of said calling line, and storage means at said remote switching means responsive to said signals from said central office for storing said line code information.

11. A telephone line concentrator system including a telephone central office, a plurality of remote substation lines, a plurality of trunks extending from said office, a plurality of number group conductors extending from said office, remote switching means for connecting said lines to said trunks in response to signals transmitted from said office over said number group conductors, coder means in said remote switching means responsive to a signal condition on one of said lines for applying signals to selected number group conductors in accordance with a code uniquely indicative of the identification of said line, means at said central office responsive to said signals for energizing selected ones of said number group conductors to disconnect said coder means from said number group conductors, wherein said means for energizing said selected conductors to disconnect said coder means from said number group conductors includes first relay transfer means at said remote switching means connected to said selected number group conductors, means at said central office effective after the operation of said first relay transfer means for thereafter applying signals to said number group conductors in accordance with a code uniquely representative of the identification of said calling line, and storage means at said remote switching means responsive to said signals from said central office for storing said line code information including in addition means at said central office for energizing additional ones of said number group conductors to disconnect said line code information storage means from said number group conductors, said means including second relay transfer means at said remote switching means connected to said selected energized conductors.

12. A telephone line concentrator system in accordance with claim 11 including in addition means at said central office for energizing selected ones of said number group conductors in accordance with a code uniquely representative of a selected trunk identification, and storage means at said remote switching means responsive to said energization of said number group conductors for storing the identification of said selected trunk.

13. A telephone line concentrator system in accordance with claim 12 including means at said central office responsive to a signal condition on one of said lines representing a hang-up condition for energizing selected number group conductors in accordance with a code representative of said trunk identification, said means including means for applying potentials to said number group conductors opposite in polarity to said potentials applied for energizing said trunk identification storage means.

References Cited by the Examiner

UNITED STATES PATENTS 3,116,375 12/63 Harr et al. ------------ 179—18

ROBERT H. ROSE, *Primary Examiner.*

WALTER L. LYNDE, *Examiner.*